(12) United States Patent
Liu et al.

(10) Patent No.: US 10,574,064 B2
(45) Date of Patent: Feb. 25, 2020

(54) OFF-GRID ENERGY STORAGE SYSTEM AND CONTROL METHOD FOR OFF-GRID ENERGY STORAGE SYSTEM

(71) Applicant: SUNGROW POWER SUPPLY CO., LTD., Hefei Anhui (CN)

(72) Inventors: Yang Liu, Hefei Anhui (CN); Changxin Zhang, Hefei Anhui (CN); Wei Cao, Hefei Anhui (CN); Yong Yu, Hefei Anhui (CN)

(73) Assignee: SUNGROW POWER SUPPLY CO., LTD., Hefei, Anhui (CN)

( * ) Notice: Subject to any disclaimer, the term of this patent is extended or adjusted under 35 U.S.C. 154(b) by 167 days.

(21) Appl. No.: 15/906,369

(22) Filed: Feb. 27, 2018

(65) Prior Publication Data
US 2018/0262022 A1   Sep. 13, 2018

(30) Foreign Application Priority Data
Mar. 7, 2017 (CN) .......................... 2017 1 0131395

(51) Int. Cl.
*H02J 7/00* (2006.01)
*H02J 7/34* (2006.01)

(52) U.S. Cl.
CPC .............. *H02J 7/0018* (2013.01); *H02J 7/34* (2013.01)

(58) Field of Classification Search
CPC ............... H02J 7/34; H02J 3/32; H02J 7/0018
See application file for complete search history.

(56) References Cited

U.S. PATENT DOCUMENTS 7,116,010 B2 * 10/2006 Lasseter ................... H02J 3/46
307/45
7,248,490 B2 * 7/2007 Olsen ..................... H02M 7/493
307/82

(Continued)

FOREIGN PATENT DOCUMENTS

CN       102122826 A    7/2011
CN       103337869 A   10/2013
(Continued)

OTHER PUBLICATIONS

SIPO First Office Action corresponding to Application No. 201710131395.2; dated Dec. 25, 2018.
(Continued)

*Primary Examiner* — Jared Fureman
*Assistant Examiner* — Duc M Pham
(74) *Attorney, Agent, or Firm* — Cantor Colburn LLP

(57) ABSTRACT

An off-grid energy storage system includes n energy storage inverters identified by $P_1, P_2, \ldots, P_n$ sequentially, direct current sides of the inverters are connected to storage batteries, and alternate current sides of the inverters are connected in parallel. The storage battery connected to the direct current side of $P_j$ is identified by $B_j$, where $j=2, 3, \ldots, n$. A control system for an output waveform of $P_1$ has a voltage-current double loop control structure, and a control system for an output waveform of $P_j$ has a current loop control structure. A current loop given value of $P_j$ is obtained by adding a current correction value of $P_j$ to a current loop given value of $P_1$. The current correction value of $P_j$ is used for causing $B_j$ to have the same operating parameter as $B_1$.

10 Claims, 3 Drawing Sheets

(56) References Cited

U.S. PATENT DOCUMENTS

| | | | |
|---|---|---|---|
| 2011/0133556 A1* | 6/2011 | Choi | H02J 3/383 307/65 |
| 2014/0375125 A1* | 12/2014 | Ye | H02J 3/24 307/26 |
| 2015/0229131 A1* | 8/2015 | Gerhardinger | H02J 3/385 307/22 |
| 2017/0047742 A1* | 2/2017 | Narla | H02J 3/385 |

FOREIGN PATENT DOCUMENTS

| | | |
|---|---|---|
| CN | 103986219 A | 8/2014 |
| CN | 104810843 A | 7/2015 |

OTHER PUBLICATIONS

Australian First Office Action corresponding to Application No. 2018201471; dated Mar. 8, 2019.

* cited by examiner

OFF-GRID ENERGY STORAGE SYSTEM AND CONTROL METHOD FOR OFF-GRID ENERGY STORAGE SYSTEM

CROSS REFERENCE TO RELATED APPLICATION

The present application claims priority under 35 U.S.C. § 119 to Chinese Application No. 201710131395.2 filed Mar. 7, 2017, the entire content of which is incorporated herein by reference.

TECHNICAL FIELD

The present disclosure relates to the field of the microgrid technology, and in particular to an off-grid energy storage system and a control method for the off-grid energy storage system.

BACKGROUND

FIG. 1 shows an off-grid energy storage system, which includes multiple energy storage inverters, a direct current side of each of the energy storage inverters is connected to an independent storage battery, and alternate current sides of the energy storage inverters are connected in parallel with the same alternate current bus, thereby converting multiple direct current inputs into one alternate current output.

Ensuring consistency of operating states of the storage batteries in the off-grid energy storage system, for example, ensuring balance among the states of charge (SOC) of the storage batteries and ensuring balance among voltages across the storage batteries is an important mean for ensuring safe and stable operation of the off-grid energy storage system. However, the current technical force still cannot provide technical support for maintaining the balance among the SOCs of the storage batteries or maintaining the balance among voltages across the storage batteries.

SUMMARY

In view of this, an off-grid energy storage system and a control method for the off-grid energy storage system are provided according to the present disclosure, to balance the operating states of storage batteries in an off-grid energy storage system.

An off-grid energy storage system is provided, which includes n energy storage inverters identified by $P_1, P_2, \ldots, P_n$ sequentially. A direct current side of each of the energy storage inverters is connected to an independent storage battery, and alternate current sides of the energy storage inverters are connected in parallel. The storage battery connected to the direct current side of $P_j$ is identified by $B_j$, where $j=2, 3, \ldots, n$. A control system for an output waveform of $P_1$ has a voltage-current double loop control structure. A control system for an output waveform of $P_j$ has a current loop control structure, a current loop given value of $P_j$ is equal to a value obtained by adding a current correction value of $P_j$ to a current loop given value of $P_1$, the current correction value of $P_j$ is an output quantity of an automatic control system for causing $B_j$ to have the same operating parameter as $B_1$.

Specifically, the operating parameter includes a state of charge of the storage battery.

Specifically, the operating parameter includes a voltage across the storage battery.

Specifically, the automatic control system is an open-loop control system.

Specifically, the automatic control system is a closed-loop control system.

Specifically, the automatic control system is configured to adjust the current correction value of $P_j$ based on a difference between the operating parameter of $B_j$ and the operating parameter of $B_1$ with a variable step size.

A control method for an off-grid energy storage system is provided. The off-grid energy storage system includes n energy storage inverters identified by $P_1, P_2, \ldots, P_n$ sequentially, a direct current side of each of the energy storage inverters is connected to an independent storage battery, and alternate current sides of the energy storage inverters are connected in parallel, the storage battery connected to the direct current side of $P_j$ is identified by $B_j$, with $j=2, 3, \ldots, n$. The control method includes: controlling, by $P_1$, an output waveform in a voltage-current double loop control mode; adjusting, by $P_1$, a current correction value of $P_1$ based on a difference between an operating parameter of $B_j$ and an operating parameter of $B_1$ to cause $B_j$ to have the same operating parameter as $B_1$; and controlling, by $P_j$, an output waveform in a current loop control mode, where a current loop given value of $P_j$ is equal to a value obtained by adding a current loop given value of $P_1$ to the adjusted current correction value of $P_j$.

Specifically, $P_j$ adjusting the current correction value of $P_j$ based on the difference between the operating parameter of $B_j$ and the operating parameter of $B_1$ includes: adjusting, by $P_j$, the current correction value of $P_j$ based on a difference between a state of charge of $B_j$ and a state of charge of $B_1$; or adjusting, by $P_j$, the current correction value of $P_j$ based on a difference between a voltage across $B_j$ and a voltage across $B_1$.

Specifically, $P_j$ adjusting the current correction value of $P_j$ based on the difference between the operating parameter of $B_j$ and the operating parameter of $B_1$ includes: adjusting, by $P_j$, the current correction value of $P_j$ in an open-loop mode or a closed-loop mode based on the difference between the operating parameter of $B_j$ and the operating parameter of $B_1$.

Specifically, $P_j$ adjusting the current correction value of $P_j$ based on the difference between the operating parameter of $B_j$ and the operating parameter of $B_1$ includes: adjusting, by $P_j$, the current correction value of $P_j$ based on the difference between the operating parameter of $B_j$ and the operating parameter of $B_1$ with a variable step size.

It can be seen from the above technical solution that, according to the present disclosure, any one energy storage inverter $P_1$ is selected to use a voltage-current double loop control mode, and the remaining energy storage inverters (i.e., $P_j$, $j=2, 3, \ldots, n$) use a current loop control mode. On this basis, according to the present disclosure, the operating parameter of the storage battery $B_1$ is taken as a reference for the operation of the storage battery $B_j$, and $P_j$ dynamically adjusts the current correction value of $P_j$ when the operation of the $B_j$ is deviated, to reduce the deviation. The current loop given value of $P_j$ is equal to a value obtained by adding the current correction value of $P_j$ to the current loop given value of $P_1$. When the difference between the operating parameter of $B_1$ and the operating parameter of $B_1$ is zero, the automatic control system reaches a steady state. In this case, the current correction value of $P_j$ is zero, that is, $P_j$ operates in accordance with the current loop given value of $P_1$. It can be seen that, according to the present disclosure, it is ensured the consistency of operating states of the storage batteries in the off-grid energy storage system.

BRIEF DESCRIPTION OF THE DRAWINGS

In order to illustrate technical solutions in the embodiments of the present disclosure or in the conventional technology more clearly, drawings used in the description of the embodiments or the conventional technology are introduced briefly hereinafter. Apparently, the drawings described hereinafter merely illustrate some embodiments of the present disclosure, and other drawings may be obtained by those skilled in the art based on these drawings without any creative efforts.

DETAILED DESCRIPTION OF THE EMBODIMENTS

The technical solutions according to the embodiments of the present disclosure will be described clearly and completely as follows in conjunction with the drawings in the embodiments of the present application. It is apparent that the described embodiments are only a part of the embodiments according to the present disclosure, rather than all the embodiments. Any other embodiments obtained by those skilled in the art based on the embodiments in the present disclosure without any creative efforts fall within the protection scope of the present disclosure.

Figure 1:
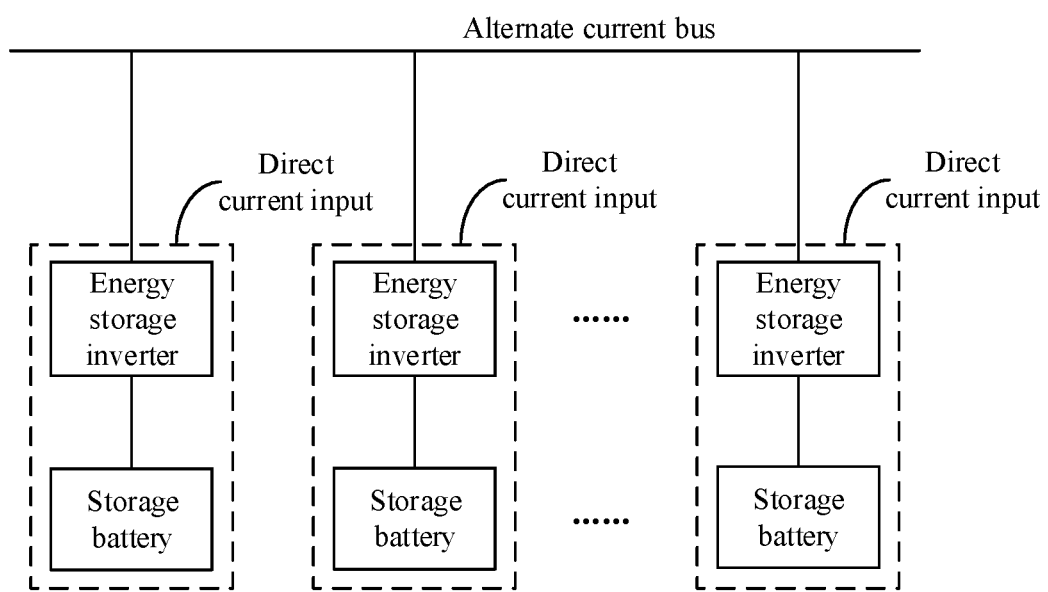
FIG. 1 is a schematic structural diagram of an off-grid energy storage system according to the conventional technology.
Figure 2:
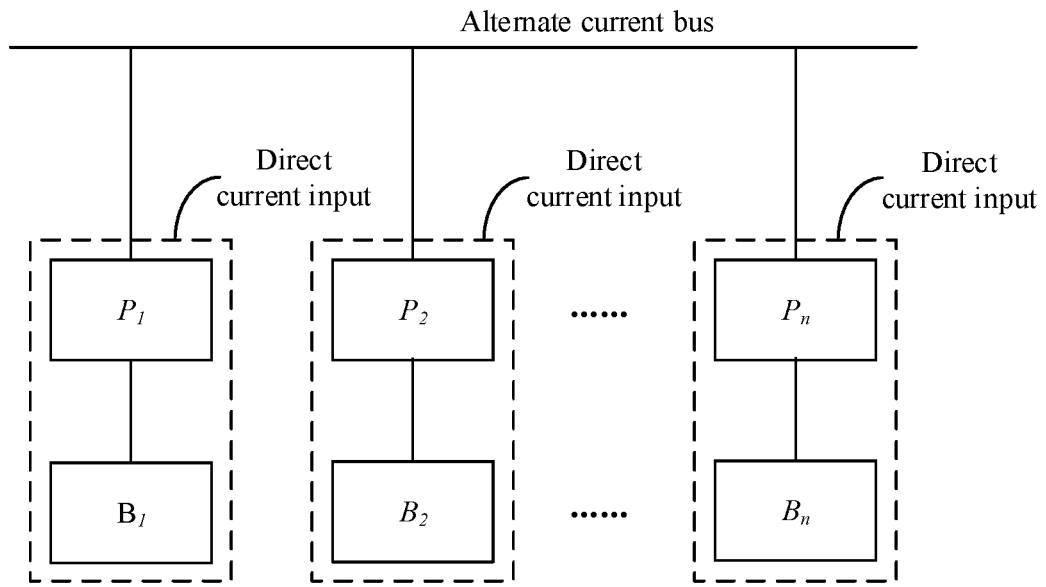
FIG. 2 is a schematic structural diagram of an off-grid energy storage system according to an embodiment of the present disclosure.

Referring to FIG. 2, an off-grid energy storage system is disclosed according to an embodiment of the present disclosure, to balance operating states of storage batteries in the off-grid energy storage system. The off-grid energy storage system includes n energy storage inverters identified by $P_1$, $P_2$, ..., $P_n$ sequentially (the identifiers of the energy storage inverters are merely used to distinguish the energy storage inverters, and the allocation of the identifiers is not targeted). A direct current side of each of the energy storage inverters is connected to an independent storage battery, and alternate current sides of the energy storage inverters are connected in parallel. The storage battery connected to the direct current side of $P_j$ is identified by $B_j$, where j=2, 3, ..., n. A control system for an output waveform of $P_1$ has a voltage-current double loop control structure. A control system for an output waveform of $P_j$ has a current loop control structure. A current loop given value of $P_j$ is equal to a value obtained by adding a current correction value of $P_j$ to a current loop given value of $P_1$. The current correction value of $P_j$ is an output quantity of an automatic control system for causing $B_j$ to have the same operating parameter as The technical solution of this embodiment is described in detail below.

The off-grid energy storage system should include at least one energy storage inverter performing V/F (voltage/frequency) control to establish a voltage and a frequency of an alternate current bus. In this embodiment, any one energy storage inverter $P_1$ is selected to use a voltage-current double loop control mode, and $P_1$ establishes the voltage and the frequency of the alternate current bus using a voltage loop. Alternate current sides of the remaining energy storage inverters (i.e., $P_j$) and the alternate current side of $P_1$ are connected in parallel with the same alternate current bus, and the remaining energy storage inverters have the same output voltage and frequency as $P_1$. In a case that the $P_1$ uses a voltage-current double loop control mode and the remaining energy storage inverters use a current loop control, the energy storage inverters operate in parallel in accordance with their own current loop given values, a current loop given value of $P_1$ is the output of the voltage loop.

During the actual operation of the off-grid energy storage system, the operating states of the storage batteries connected to the direct current sides of the energy storage inverters may be asynchronous due to factors such as different manufacturers or different production batches of the storage batteries. If the operating states of the storage batteries are not balanced, the difference among the operating states of the storage batteries and among the operating states of the energy storage inverters may be larger and larger.

In this regard, in this embodiment, the operating parameter of $B_1$ is taken as the reference of the operation of $B_j$, and an automatic control system (denoted as $Z_j$) in $P_j$ dynamically adjusts the current correction value of $P_1$ based on the deviation of the operating parameter of $B_j$ for synchronous operation between $B_j$ with $B_1$. The current loop given value of $P_j$ is equal to a value obtained by adding the current loop given value of $P_1$ to the output of $Z_j$ (that is, the adjusted current correction value of $P_j$). When the difference between the operating parameter of $B_j$ and the operating parameter of $B_1$ is zero, the automatic control system reaches a steady state. In this case, the current correction value of $P_j$ is zero, that is, $P_j$ operates in accordance with the current loop given value of $P_1$. It can be seen that, according to this embodiment, it is ensured the consistency of operating states of the storage batteries in the off-grid energy storage system.

Figure 3:
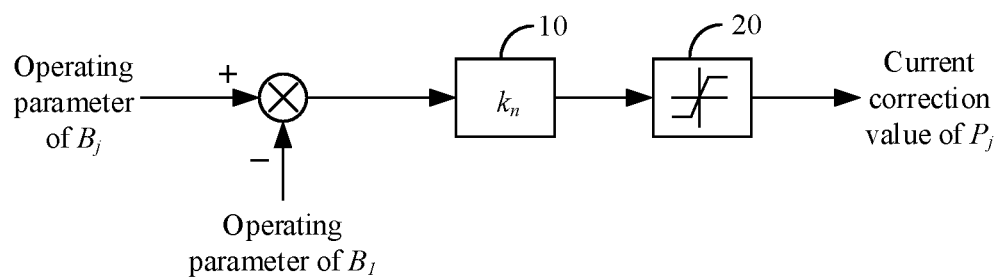
FIG. 3 is a block diagram of an open-loop control system according to an embodiment of the present disclosure.
Figure 4:
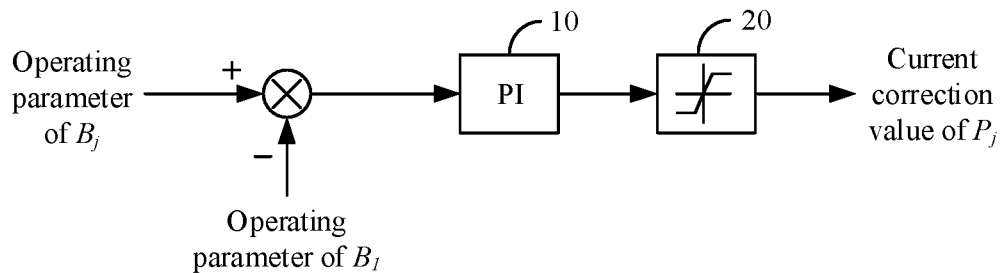
FIG. 4 is a block diagram of a closed-loop control system according to an embodiment of the present disclosure.

Specifically, $Z_j$ may be an open-loop control system, or may be a closed-loop control system. Specifically, in a case that $Z_1$ is an open-loop control system, the structure as shown in FIG. 3 may be used, in which the difference between the operating parameter of $B_j$ and the operating parameter of $B_1$ is processed by a proportional adjustment unit 10 and an output amplitude limiting unit 20 to obtain the current correction value of $P_j$. In a case that $Z_j$ is a closed-loop control system, the structure as shown in FIG. 4 may be used, in which the difference between the operating parameter of $B_j$ and the operating parameter of $B_1$ is processed by a PI controller 10 (or other types of controller such as PID regulator or I regulator) and an output amplitude limiting unit 20 to obtain the current correction value of $P_j$. It should be noted that, each of a proportional factor $k_n$ of the proportional adjustment unit 10 and the parameter of the PI controller 10 may be a fixed parameter, or may be adjusted based on the difference between the operating parameter of $B_j$ and the operating parameter of $B_1$ with a variable step size. That is, the parameter becomes larger in a case of a large difference to achieve fast balance, and the parameter becomes smaller in a case of a small difference to achieve fine adjustment.

Specifically, $Z_j$ controlling $B_j$ to have the same operating parameter as $B_1$ may mean that there is no difference between the voltage across $B_j$ and the voltage across $B_1$ or may mean that there is no difference between the state of charge of $B_j$ and the state of charge of $B_1$.

Specifically, a sampling signal, a control signal, and the like, may be transmitted in the off-grid energy storage system in a CAN bus communication mode, RS485 communication mode, Ethernet communication mode, or power line carrier communication mode, etc., which is not limited.

Figure 5:
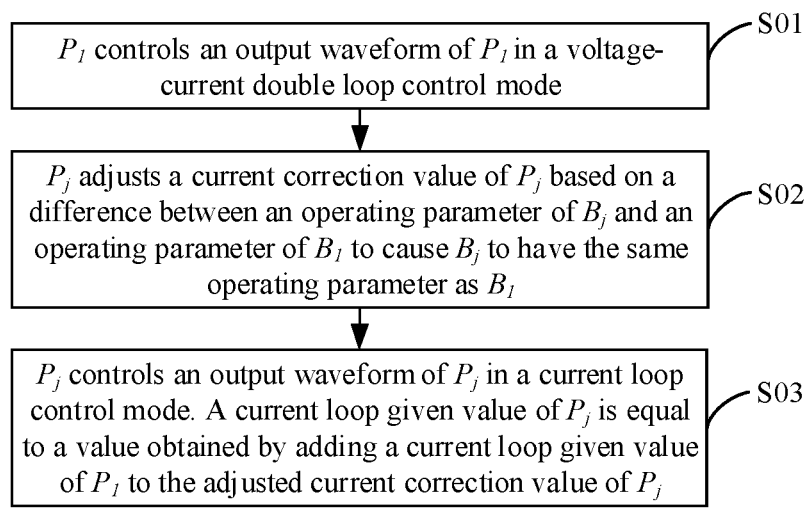
FIG. 5 is a flowchart of a control method for an off-grid energy storage system according to an embodiment of the present disclosure.

In addition, referring to FIG. 5, a control method for an off-grid energy storage system is disclosed according to the present application. The off-grid energy storage system includes n energy storage inverters identified by $P_1, P_2, \ldots, P_n$ sequentially, a direct current side of each of the energy storage inverters is connected to an independent storage battery, and alternate current sides of the energy storage inverters are connected in parallel, the storage battery connected to the direct current side of $P_j$ is identified by $B_j$, where $j=2, 3, \ldots, n$. The control method includes steps S01 to S03.

In step S01, $P_1$ controls an output waveform of $P_1$ in a voltage-current double loop control mode.

In step S02, $P_j$ adjusts a current correction value of $P_j$ based on a difference between an operating parameter of $B_j$ and an operating parameter of $B_1$ to cause $B_j$ to have the same operating parameter as $B_1$.

In step S03, $P_j$ controls an output waveform of $P_j$ in a current loop control mode. A current loop given value of $P_j$ is equal to a value obtained by adding a current loop given value of $P_1$ to the adjusted current correction value of $P_j$.

Specifically, $P_j$ adjusting the current correction value of $P_j$ based on the difference between the operating parameter of $B_j$ and the operating parameter of $B_1$ includes: adjusting, by $P_j$, the current correction value of $P_j$ based on a difference between a state of charge of $B_j$ and a state of charge of $B_1$; or adjusting, by $P_j$, the current correction value of $P_j$ based on a difference between a voltage across $B_j$ and a voltage across $B_1$.

Specifically, $P_j$ adjusting the current correction value of $P_j$ based on the difference between the operating parameter of $B_j$ and the operating parameter of $B_1$ includes: adjusting, by $P_j$, the current correction value of $P_j$ in an open-loop mode or a closed-loop mode based on the difference between the operating parameter of $B_j$ and the operating parameter of $B_1$.

Specifically, $P_j$ adjusting the current correction value of $P_j$ based on the difference between the operating parameter of $B_j$ and the operating parameter of $B_1$ includes: adjusting, by $P_j$, the current correction value of $P_j$ based on the difference between the operating parameter of $B_j$ and the operating parameter of $B_1$ with a variable step size.

In summary, according to the present disclosure, any one energy storage inverter $P_1$ is selected to use a voltage-current double loop control mode, and the remaining energy storage inverters (i.e., $P_j$, $j=2, 3, \ldots, n$) use a current loop control mode. On this basis, according to the present disclosure, the operating parameter of the storage battery $B_1$ is taken as a reference for the operation of the storage battery $B_j$, and $P_j$ dynamically adjusts the current correction value of $P_j$ when the operation of the $B_j$ is deviated, to reduce the deviation. The current loop given value of $P_j$ is equal to a value obtained by adding the current correction value of $P_j$ to the current loop given value of $P_1$. When the difference between the operating parameter of $B_j$ and the operating parameter of $B_1$ is zero, the automatic control system reaches a steady state. In this case, the current correction value of $P_j$ is zero, that is, $P_j$ operates in accordance with the current loop given value of $P_1$. It can be seen that, according to the present disclosure, it is ensured the consistency of operating states of the storage batteries in the off-grid energy storage system.

In the present specification, the embodiments are described in progressive manner. Each embodiment mainly focuses on an aspect different from other embodiments, and reference can be made to these similar parts among the embodiments. The control method for the off-grid energy storage system in the embodiment corresponds to the off-grid energy storage system disclosed in the embodiment, and is described relatively simply. For detailed description of the control method, reference may be made to the related description of the off-grid energy storage system.

The above illustration of the disclosed embodiments enables those skilled in the art to implement or practice the present disclosure. Many changes to these embodiments are apparent for those skilled in the art, and general principles defined herein can be implemented in other embodiments without departing the spirit or scope of the present disclosure. Hence, the present disclosure is not limited to the embodiments disclosed herein, but is to conform to the widest scope consistent with principles and novel features disclosed herein.

The invention claimed is:

1. An off-grid energy storage system, comprising n energy storage inverters identified by $P_1, P_2, \ldots, P_n$ sequentially, wherein a direct current side of each of the energy storage inverters is connected to an independent storage battery, and alternate current sides of the energy storage inverters are connected in parallel, wherein the storage battery connected to the direct current side of $P_j$ is identified by $B_j$, where $j=2, 3, \ldots, n$, wherein
   a control system for an output waveform of $P_1$ has a voltage-current double loop control structure; and
   a control system for an output waveform of $p_j$ has a current loop control structure, wherein a current loop given value of $p_j$ is equal to a value obtained by adding a current correction value of $P_j$ to a current loop given value of $P_1$, wherein the current correction value of $P_j$ is an output quantity of an automatic control system for causing $B_j$ to have the same operating parameter as $B_1$.

2. The off-grid energy storage system according to claim 1, wherein the operating parameter comprises a state of charge of the storage battery.

3. The off-grid energy storage system according to claim 1, wherein the operating parameter comprises a voltage across the storage battery.

4. The off-grid energy storage system according to claim 1, wherein the automatic control system is an open-loop control system.

5. The off-grid energy storage system according to claim 1, wherein the automatic control system is a closed-loop control system.

6. The off-grid energy storage system according to claim 1, wherein the automatic control system is configured to adjust the current correction value of $P_j$ based on a difference between the operating parameter of $B_j$ and the operating parameter of $B_1$ with a variable step size.

7. A control method for an off-grid energy storage system, the off-grid energy storage system comprising n energy storage inverters identified by $P_1, P_2, \ldots, P_n$ sequentially, a direct current side of each of the energy storage inverters being connected to an independent storage battery, and alternate current sides of the energy storage inverters being connected in parallel, the storage battery connected to the direct current side of $P_j$ being identified by $B_j$, with $j=2, 3, \ldots, n$, wherein the control method comprises:
   controlling, by $P_1$, an output waveform of $P_1$ in a voltage-current double loop control mode;

adjusting, by $P_j$, a current correction value of $P_j$ based on a difference between an operating parameter of $B_j$ and an operating parameter of $B_1$ to cause $B_j$ to have the same operating parameter as $B_1$; and controlling, by $P_j$, an output waveform of $P_j$ in a current loop control mode, wherein a current loop given value of $P_j$ is equal to a value obtained by adding a current loop given value of $P_1$ to the adjusted current correction value of $P_j$.

8. The control method according to claim 7, wherein $P_j$ adjusting the current correction value of $P_j$ based on the difference between the operating parameter of $B_j$ and the operating parameter of $B_1$ comprises:

adjusting, by $P_j$, the current correction value of $P_j$ based on a difference between a state of charge of $B_j$ and a state of charge of $B_1$; or adjusting, by $P_j$, the current correction value of $P_j$ based on a difference between a voltage across $B_j$ and a voltage across $B_1$.

9. The control method according to claim 7, wherein $P_j$ adjusting the current correction value of $P_j$ based on the difference between the operating parameter of $B_j$ and the operating parameter of $B_1$ comprises:

adjusting, by $P_j$, the current correction value of $P_j$ in an open-loop mode or a closed-loop mode based on the difference between the operating parameter of $B_j$ and the operating parameter of $B_1$.

10. The control method according to claim 7, wherein $P_j$ adjusting the current correction value of $P_j$ based on the difference between the operating parameter of $B_j$ and the operating parameter of $B_1$ comprises:

adjusting, by $P_j$, the current correction value of $P_j$ based on the difference between the operating parameter of $B_j$ and the operating parameter of $B_1$ with a variable step size.

\* \* \* \* \*